United States Patent
Tsymbal et al.

[11] 3,762,254
[45] Oct. 2, 1973

[54] DEVICE FOR CUTTING RODS TO LENGTH PIECES

[76] Inventors: Vasily Iosifovich Tsymbal, ulitsa Voznesenskogo, 25, kv. 4.; Vladimir Georgievich Gevich, ulitsa Katerinicha, 22, kv. 6, both of Kramatorsk Donetskoi Oblasti, U.S.S.R.

[22] Filed: May 19, 1972

[21] Appl. No.: 255,042

[52] U.S. Cl. ............... 83/107, 83/150, 83/151, 83/155, 83/167, 83/425.3, 83/434, 83/435, 83/664
[51] Int. Cl. ............................................. B26d 3/16
[58] Field of Search .................. 83/435, 83/664 83/151, 154, 155, 167, 425, 425.3, 664, 434, 435

[56] References Cited
UNITED STATES PATENTS

| | | | |
|---|---|---|---|
| 2,294,658 | 9/1942 | Hazeltine | 83/425 X |
| 2,511,058 | 6/1950 | Hambleton, Sr. et al. | 83/664 X |
| 2,506,117 | 5/1950 | Stiefvater | 83/425.3 X |
| 2,978,942 | 4/1961 | Casino | 83/425.3 X |
| 3,411,392 | 11/1968 | Spangler | 83/664 |

Primary Examiner—Frank T. Yost
Attorney—Eric H. Waters et al.

[57] ABSTRACT

A device employed in tool industry for the mass production of length pieces. The device comprises gang shears as well as a conveyor for feeding rods to the cutting zone and means for removal of the length pieces.

7 Claims, 3 Drawing Figures

DEVICE FOR CUTTING RODS TO LENGTH PIECES

The present invention relates to the art of machining and, in particular, to devices for cutting straight wire rods to length pieces especially in tool industry in producing rotary needle files and on other occasions where there is a need in large quantities of the length pieces.

Known in the art are devices for cutting rods or rod coils to the length pieces in which the material being cut is fed to a knife means along the axis of the piece.

Also known are arrangements in which a cutting gear traverses along the axis of the length piece.

The known devices are designed on the principle of intermittent feeding of the material being cut to the knife means, i.e. cutting is effected not continuously but with a stoppage. For this reason the above devices feature a comparatively low feeding speed. It is practically impossible to increase the feeding speed of the material being cut since in that case the cutting gear has no time to operate.

Moreover, in measuring the length of the piece an error is unavoidable due to slippage of the stock being cut in a feeding gear or owing to inaccurate stopping of the cutting gear.

In cutting rod coils to length pieces on the previous devices the coils shall meet rather stringent requirements in terms of their quality. Each rod coil shall consists of a single length of wire, its turns running dead true in uniform rows. If the above conditions is not satisfied, the wire may get entangled during unwinding from a coil being thereby unfit for further use. This leads to large down time and increases scrap figures. The cut-off length pieces fall of their own weight in a bin being thereafter collected by hand in bundles. This is a tiresome and inefficient manual job which may oftentimes result in injuries to operator hands.

A device for cutting rod coils to length pieces has been previously proposed (see Author's Certificate of USSR, No. 189797, Cl. 7d,5).

It comprises straightening rollers, a feeding gear to deliver the stock being cut to knives and a cutting gear. The feeding gear is made in the form of two rolls one of which is mounted on a spring-biased lever. The cutting gear is fitted with a movable knife actuated by a revolving cam.

A device for cutting rods to length pieces (see Author's Certificate of USSR, No. 236416, Cl.7d,5) is also known. It comprises a rod clamping gear, a cutting gear and a knife traversing gear.

The cutting gear constitutes two coaxially mounted discs held tightly to each other and fitted with holes whose number and diameters correspond to those of the rods being cut. The cutting gear together with a drive for turning one of the discs about its axis is mounted on a carriage, The latter advances along the rod axis conveying the knives to a cutting place.

The cutting of wire rods to length pieces on the prior-art devices is effected by unwinding the wire from one or two coils this being responsible for low productivity of the devices.

Hence the production of the length pieces can be extended only provided that the number of the devices adopted so far for this purpose is considerably increased.

The basic object of the present invention is to provide a device which would offer an increase in the production of length pieces.

Another object of this invention is to develop a device which would enable mechanized removal of the length pieces.

Still another object of the invention is to provide a device ensuring high accuracy in cutting rods to length pieces.

These and other objects are attained by the fact that in a device for cutting rods to length pieces comprising a cutting tool, a conveyor adapted for feeding the rods to the cutting tool and mounted in front of the tool, and magazines to accommodate the length pieces, according to the invention, the cutting tool employed thereof constitutes gang shears made up to two groups of cutting discs mounted one above another on two parallel shafts and a load-carrying member of the conveyor is arranged to move in the direction perpendicular to the longitudinal axis of the shafts and is designed to accommodate the rods arranged in parallel with said shafts by which virtue the rod being fed to the gang shears is cut simultaneously to several length pieces, and each pair of the cutting discs is fitted with a means for positive removal of the length pieces just from the cutting zone of this pair and their conveyance to the magazines.

According to one of the possible embodiments of the invention it may incorporate a rod feeding conveyor built-up of several endless belts travelling with a speed equal to that of rotation of the cutting discs, and of lifting-and-depressing table referred to hereinafter as a lifting table adapted to accommodate the rods and provided with slots equal in number to that of the conveyor belts, perpendicular to the shafts of the gang shears and accommodating the endless belts so that when the table is depressed the rods arranged on it get on the conveyor to be delivered to the gang shears.

The upper shaft of the gang shears is advisable to be displaced relative to the lower shaft in the direction of the feeding conveyor, the shaft cutting discs being forced against the conveyor endless belts. As a result the rods being conveyed to the gang shears are at first clamped and then cut off.

In another version of the invention the means for positive removal of the length pieces is formed by two endless conveyor belts arranged in one and the same vertical plane one above another and in intimate contact with each other, the length piece being firstly clamped between the said belts in the cutting zone to be conveyed in this position to the magazine.

It would be expedient that the rod feeding conveyor would pass around or encompass one of the shafts of the gang shears to rotate together with this shaft.

It would be sound practice if the adjacent conveyor pairs would handle the length pieces in the planes located at an angle to each other.

Each of the endless conveyor belts is advisable to encompass one of the shafts of the gang shears to rotate together with the shaft thereof.

In the above device the rods are fed to the cutting zone in the transverse direction to their axes and hence a large number of rods are cut in succession, each rod being cut to several length pieces assuring high overall efficiency of the device. In this case an adequate accuracy of cutting is attained which is determined by the spacing between two adjoining pairs of the cutting discs.

Low quality of the wire coils does not affect the operation of the device insofar as their unwinding is avoided.

The removal of the cut off length pieces is fully mechanized.

The nature of the present invention is more fully apparent from a consideration of the following description of an exemplary embodiment thereof to be taken in conjunction with the accompanying drawings, in which.

Figure 1:
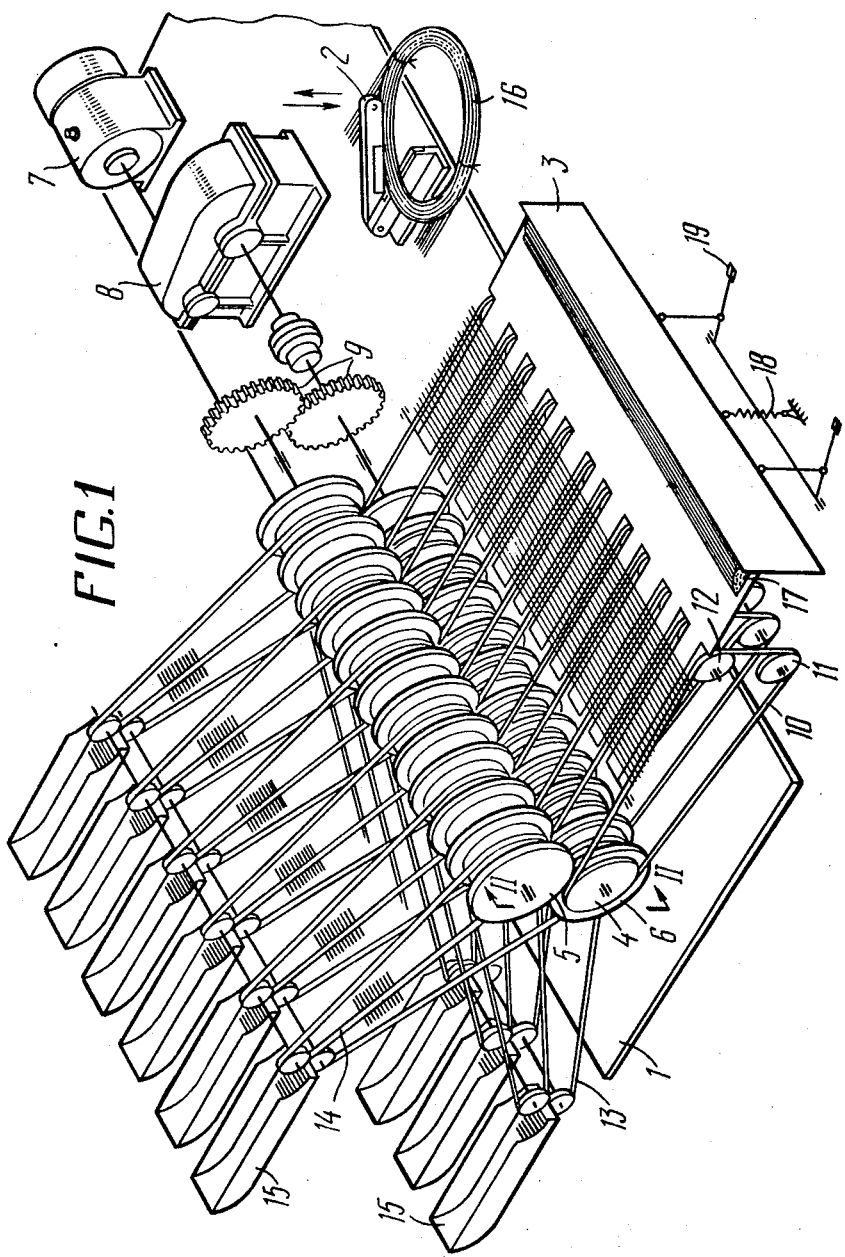
FIG. 1 is a general functional diagram of a device, conforming to the invention.
Figure 2:
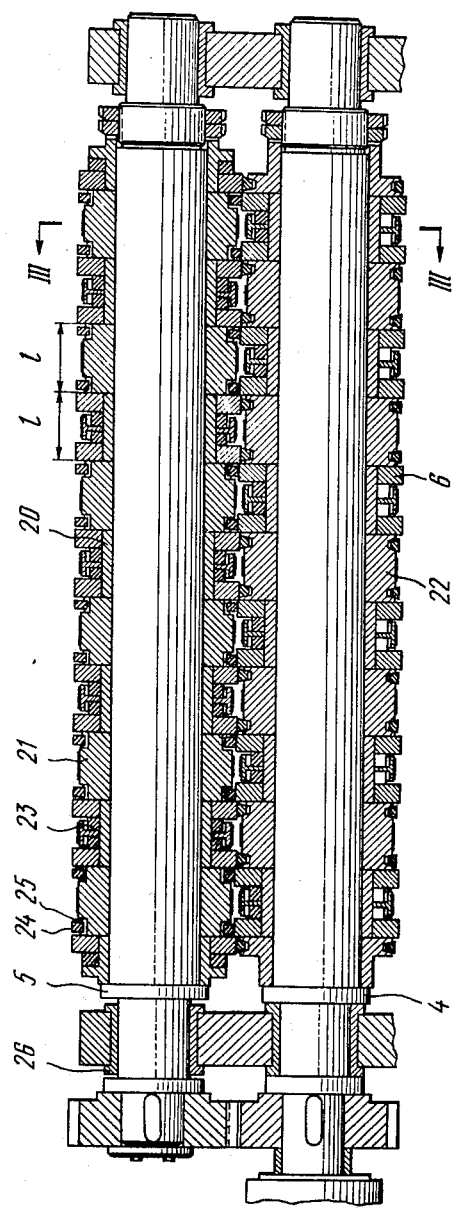
FIG. 2 shows a longitudinal section along the line II—II of FIG. 1.

On a casing 1 (FIG. 1) of a device are mounted hand or vibration shears 2 for cutting wire coils to rods and a lifting-and-depressing table 3 referred to hereinafter as a lifting table 3 with a system of levers. When set to an extreme upper position the lifting table 3 is held in place by a spring 18. Set up on an upper plate of the casing 1 in bearings 26 (FIG. 2) are two horizontal shafts 4 and 5 with a set of cutting discs 6 (FIG. 2). Both the length of the shafts 4 and 5 and the number of the cutting discs 6 (FIG. 2) depends on the length of the rods (coil diameter) to be cut, and spacing "1" between the cutting discs — on the length of the piece required. The shafts 4 and 5 are connected with each other by means of gears 9 and with a motor through a transmission 8. The lower shaft 4 and rollers 11 and 12 mount several endless conveyor belts 10 adapted to feed the rods to gang shears, the top and bottom strands of the conveyor running in slots of the lifting table 3. The slots are provided on the front side of the table perpendicularly to the axes of the shafts 4 and 5.

Each pair of the cutting discs is fitted with a means for positive removal of the length pieces just from the cutting zone of this pair and their conveyance to a magazine 15.

The means for positive removal of the length pieces is made up of two endless conveyor belts located in one and the same vertical plane one above another and in intimate contact with each other. The adjacent pairs of the conveyor belts transport the length pieces in planes located at an angle to each other.

Spacing "1" between the cutting discs is fixed by distance sleeves 20, 21 and 22 similar in length. The cutting discs 6 are continually forced against the distance sleeves 21 and 22 with the aid of yieldable members 23.

Flexible washers 24 mounted on rings made from anti-friction material 25 are free to revolve on the distant sleeves 21.

Figure 3:
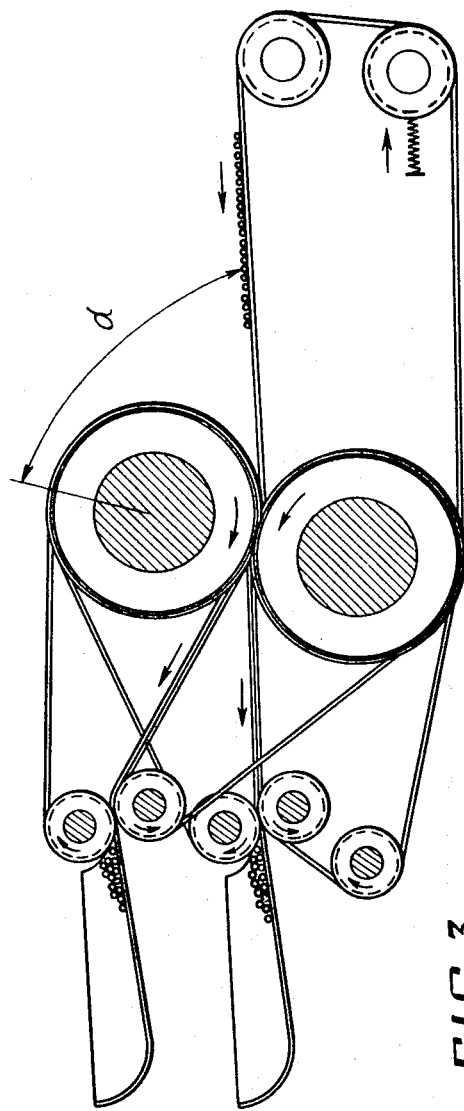
FIG. 3 depicts a lateral section along the line III—III of FIG. 2.

The sleeves 21 and 22 act also as conveyor pulleys. An axis connecting centerpoints of the shafts 4 and 5 (FIG. 1) is inclined to the plane of the feeding conveyor. Angle of inclination "α" (FIG. 3) selected in accordance with the diameter and material of the rods being cut varies from 70° to 85°.

The above device functions as follows.

Where the stock to be cut is fed in coils 16 (FIG. 1) they are cut by hand or vibration shears 2 to rods 17. The wire in the coils shall be free from plastic bending and the rods shall be straight after the cutting operation without additional straightening. The straight rods 17 are laid on a lifting-and-depressing table 3 referred to hereinafter as a lifting table 3 (FIG. 1) being distributed on the table in a single row. Next a lever 19 is depressed to descend table 3 the rods being lowered to a feeding conveyor 10.

At the end of the stroke of the lever 19 a device drive motor 7 is switched on automatically and the conveyor 10 will handle the rods to cutting discs 6. Owing to the contact between the cutting discs 6 of an upper shaft 5 (FIG. 1) and the feeding conveyor belt 10 the rods are held tight to the upper shaft 5 by the belts 10 and to the lower shaft 4 (FIG. 1) by flexible washers (FIG. 2).

Clamping of the rods 17 is effected prior to the cutting operation. This ensures accurate cutting, the clamping of the length pieces between the conveyor belts 13 and 14 of a means for piece removal as well as further transportation of the pieces to magazines 15. The length pieces are periodically withdrawn from the magazines for subsequent usage.

In cutting rods to length pieces the use of the above device offered about a 100-fold increase in the production rate as compared with the previous arrangements. Thus when cutting rods 0.26 – 0.32 mm. in diameter the production rate of the prior-art device amounts to 0.4 kg/hr.

In cutting the rods of the same diameter on the device of the invention it is equal to 50 kg/hr.

What is claimed is:

1. A device for cutting rods to length pieces comprising: gang shears; two parallel shafts of said gang shears mounted one above another; cutting discs set up on said shafts; a conveyor for feeding said rods to said gang shears located in front of the shears and fitted with a load-carrying member arranged to move in the direction perpendicular to the longitudinal axis of said shafts and designed to accomodate the rods arranged in parallel with said shafts by which virtue the rod being fed to the gang shears is cut simultaneously to several length pieces; a means for positive removal of the length pieces just from the cutting zone, said means being situated near each pair of said cutting discs; magazines for the length pieces equal in number to that of the means for positive removal of the length pieces conveyed to the above magazines.

2. A device of claim 1 in which a rod feeding conveyor is made up of several endless belts travelling with a speed equal to that of rotation of the cutting discs, and of a lifting table designed to accommodate the rods the table being fitted with slots corresponding in number to that of the conveyor belts which slots are located perpendicularly to the shafts of the gang shears and are adapted to so accommodate the endless belts that when the table is lowered the rods located on it get onto the conveyor belts to be fed to the gang shears.

3. A device of claim 2 in which the rod feeding conveyor passes round one of the shaft of the gang shears for rotation together with the shaft.

4. A device of claim 1 in which the upper shaft of the gang shears is displaced relative to the lower one towards the rod feeding conveyor, its cutting discs being held tight to the endless belts of the conveyor by which virtue the rods fed to the gang shears are firstly clamped and then cut off.

5. A device of claim 1 in which a means for positive removal of the length pieces is built-up of two endless conveyor belts arranged in one and the same vertical plane one above another being in intimate contact with each other, the length piece being clamped between said belts in the cutting zone and then conveyed in that position to the magazine.

6. A device of claim 5 in which adjacent pairs of the conveyor belts transfer the length pieces in the plane located at an angle to each other.

7. A device of claim 5 in which each of the endless conveyor belts passes round one of the shafts of the gang shears for rotation together with the shaft.

* * * * *

UNITED STATES PATENT OFFICE
CERTIFICATE OF CORRECTION

Patent No. 3,762,254          Dated October 2, 1973

Inventor(s) Vasily Iosifovich Tsymbal et al.

It is certified that error appears in the above-identified patent and that said Letters Patent are hereby corrected as shown below:

The second inventor's name should read

-- Valdimir Georgievich Gevlich --.

Signed and sealed this 29th day of October 1974.

(SEAL)
Attest:

McCOY M. GIBSON JR.          C. MARSHALL DANN
Attesting Officer          Commissioner of Patents